United States Patent
Jang et al.

(10) Patent No.: US 10,862,089 B2
(45) Date of Patent: Dec. 8, 2020

(54) SECONDARY BATTERY CASE HAVING VENT FILLED WITH THERMOPLASTIC RESIN

(71) Applicant: LG Chem, Ltd., Seoul (KR)

(72) Inventors: Kyung Min Jang, Daejeon (KR); Duk Hyun Ryu, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 16/180,331

(22) Filed: Nov. 5, 2018

(65) Prior Publication Data

US 2019/0181408 A1 Jun. 13, 2019

(30) Foreign Application Priority Data

Dec. 8, 2017 (KR) ........................ 10-2017-0168048

(51) Int. Cl.
*H01M 2/12* (2006.01)

(52) U.S. Cl.
CPC ....... *H01M 2/1241* (2013.01); *H01M 2/1282* (2013.01); *H01M 2220/10* (2013.01); *H01M 2220/20* (2013.01); *H01M 2220/30* (2013.01)

(58) Field of Classification Search
CPC . H01M 2/1241; H01M 2/1294; H01M 2/1282
See application file for complete search history.

(56) References Cited

U.S. PATENT DOCUMENTS

| | | | |
|---|---|---|---|
| 8,012,617 B2 * | 9/2011 | Choi | H01M 2/024 429/53 |
| 8,147,998 B2 * | 4/2012 | Yeo | H01M 2/0202 429/56 |
| 8,802,254 B2 | 8/2014 | Lee | |
| 8,920,964 B2 * | 12/2014 | Yoon | H01M 2/1241 429/163 |
| 9,590,218 B2 * | 3/2017 | Roh | H01M 2/0217 |
| 2003/0077505 A1 * | 4/2003 | Goda | H01M 2/0207 429/56 |
| 2003/0232236 A1 * | 12/2003 | Mitchell | H01M 2/0212 429/56 |
| 2006/0024574 A1 * | 2/2006 | Yim | H01M 2/1241 429/174 |
| 2008/0220321 A1 * | 9/2008 | Yonemochi | H01M 2/105 429/89 |
| 2008/0233468 A1 * | 9/2008 | Otohata | H01G 2/08 429/53 |
| 2009/0035647 A1 * | 2/2009 | Takagi | H01M 2/1241 429/53 |
| 2012/0015218 A1 | 1/2012 | Lee | |

(Continued)

FOREIGN PATENT DOCUMENTS

JP 1995-169452 A 7/1995
JP 1997-245837 A 9/1997

(Continued)

*Primary Examiner* — Michael L Dignan
(74) *Attorney, Agent, or Firm* — Morgan, Lewis & Bockius LLP

(57) ABSTRACT

A battery case having a venting notch formed therein is provided. In particular, the venting notch is filled with a thermoplastic resin to protect a battery and/or a battery case from physical impacts. The thermoplastic resin has a glass transition temperature lower than a temperature limit of the battery for a safe operation.

1 Claim, 2 Drawing Sheets

(56) References Cited

U.S. PATENT DOCUMENTS

2013/0330580 A1* 12/2013 Yamamoto .......... H01M 2/1294
 429/54
2014/0199581 A1* 7/2014 Ryu .................. H01M 10/0413
 429/161
2016/0260552 A1* 9/2016 Sato .................... H01M 2/0285

FOREIGN PATENT DOCUMENTS

| | | | |
|---|---|---|---|
| JP | 2007-027011 A | 2/2007 | |
| KR | 10-2000-0014825 A | 3/2000 | |
| KR | 10-2007-0027358 A | 3/2007 | |
| KR | 100696787 B1 * | 3/2007 | ............. H01M 2/04 |
| KR | 10-2008-0036248 A | 4/2008 | |
| KR | 20120009592 A | 2/2012 | |
| KR | 10-2012-0095703 A | 8/2012 | |
| KR | 20130134948 A | 12/2013 | |
| KR | 20170103192 A | 9/2017 | |

* cited by examiner (a)

(b)

(c)

SECONDARY BATTERY CASE HAVING VENT FILLED WITH THERMOPLASTIC RESIN

CROSS-REFERENCE TO RELATED APPLICATION

This application claims the benefit of Korean Application No. 10-2017-0168048 filed on Dec. 8, 2017, the disclosure of which is herein incorporated by reference in its entirety.

TECHNICAL FIELD

The present invention relates to a battery case having a venting unit and a battery including the same, and more particularly to a battery case including a venting unit having a structure in which a venting notch is formed in the battery case and in which the venting notch is filled with a thermoplastic resin.

RELATED ART

Based on the shape of a battery case, secondary batteries are classified into a cylindrical battery having an electrode assembly mounted in a cylindrical metal can, a prismatic battery having an electrode assembly mounted in a prismatic metal can, and a pouch-shaped battery having an electrode assembly mounted in a pouch-shaped case made of an aluminum laminate sheet. The electrode assembly, which is mounted in the battery case, is a power-generating element having a structure in which a positive electrode, a separator, and a negative electrode are stacked and configured to be capable of being charged and discharged. The electrode assembly is classified as a jelly-roll type electrode assembly, which has a structure in which a long sheet type positive electrode and a long sheet type negative electrode, to which active materials are applied, are wound with a separator interposed between the positive electrode and the negative electrode, or a stacked type electrode assembly, which has a structure in which a plurality of positive electrodes having a predetermined size and a plurality of negative electrodes having a predetermined size are sequentially stacked with separators interposed respectively between the positive electrodes and the negative electrodes.

When a secondary battery is overheated, the secondary battery may explode. Consequently, it is important to prevent explosion of the secondary battery. The secondary battery may overheat due to various causes. In an example, the secondary battery may overheat when overcurrent flows in the secondary battery. When overcurrent flows in the secondary battery, the secondary battery generates heat, and the temperature in the secondary battery increases. As the temperature in the secondary battery increases, a liquid electrolyte in the secondary battery is changed into a gaseous phase. As a result, the pressure in the secondary battery increases, whereby the pouch-shaped case of the secondary battery expands. In other words, a so-called swelling phenomenon occurs. The secondary battery is deformed due to this swelling phenomenon, whereby a short circuit occurs in the secondary battery or the secondary battery explodes.

Although secondary batteries vary in shape, a secondary battery is typically provided with a means for relieving high pressure, which directly causes the explosion of the secondary battery. For a cylindrical battery, a safety plate having a specific structure is mounted to a cap assembly to relieve high pressure. For a prismatic battery, a notch is formed in a cap or a case of the battery to relieve high pressure. For a pouch-shaped battery, seamed portions (sealed portions) of a laminate sheet are separated from each other without the provision of a separate notch to relieve high pressure.

A conventional prismatic battery includes a partially open curved notch formed in the side surface of a battery case. The curved notch is formed in a portion of the battery case subjected to a larger amount of stress to allow the curved notch to rupture when the pressure in the battery increases above a particular level.

The notch having the above-described structure sensitively responds to the high pressure generated in the battery, but an intended pressure critical value is required to be set at the time of designing the battery. Since high stress is applied to the side edge of the battery case, the notch may rupture even at a low pressure. Particularly, when the thickness of the battery case is too small, the notch may unintentionally rupture, since the notch particularly sensitively responds to high pressure.

It is necessary to reduce the size and depth of a notch formed in a portion of the battery case subjected to a large amount of stress. When the size and depth of the notch are reduced, however, the notch may not easily rupture.

Research has been continuously conducted on a prismatic battery configured to allow gas to be rapidly discharged through uniform rupture of a notch when the pressure in a battery increases in consideration of the position, shape, length, and depth of the notch based on the thickness of a battery case and the stress experienced thereby.

Korean Patent Application Publication No. 2012-0095703 discloses a prismatic secondary battery provided with a notch including a section at which the residual thickness (the thickness obtained by subtracting the depth of a notch from the thickness of a case body) is discontinuously reduced from a vertical central axis portion of the case body (a "discontinuous reduction section"). However, this patent document does not suggest a structure in which the notch is filled with a thermoplastic resin.

Korean Patent Application Publication No. 2007-0027358 discloses a secondary battery including a vent formed in the side surface of a case, wherein the vent is disposed between 40 degrees and 50 degrees of a tilt angle that increases from one side of a shorter side of the case along a longer side of the case and wherein the vent has a right angle. However, this patent document does not suggest a structure in which the vent is filled with a thermoplastic resin.

Korean Patent Application Publication No. 2000-0014825 discloses a battery case having a first notch formed in the circumference of one side of a round part disposed at the bottom of a battery case and a second notch formed in the circumference of the other side of the round part to be opposite the first notch. However, this patent document does not suggest a structure in which any of the notches is filled with a thermoplastic resin.

A technology for a reliable notch configured to rapidly rupture at a desired pressure to discharge gas has not been suggested to date.

SUMMARY

In one aspect, the present invention provides a battery case comprising at least one venting notch formed in an inner surface or an outer surface of the battery case. The battery case may be made of a metal, a resin, or a laminate sheet. The venting notch may be filled with a thermoplastic resin. The venting notch may be formed to allow gas to be discharged to prevent a battery from exploding when a pressure in the battery case increases. A depth of the venting notch may be about 100 to 150% compared with a depth of a venting notch that is not filed with a thermoplastic resin. The thermoplastic resin of the venting notch may have a glass transition temperature lower than a temperature limit of a battery for a safe operation. The glass transition temperature may range from about 110° C. to 140° C. For example, the thermoplastic resin may be at least one selected from a group consisting of polyethylene, polyethylene terephthalate, polyvinyl chloride, polyvinylidene chloride, polystyrene, polypropylene, a polyamide resin, and a celluloid resin. The thermoplastic resin may be filled about 100% or less of a depth of the venting notch. The venting notch may be formed along a curved line, a straight line, a combination of a curved line and a straight line, and/or a plurality of dots. A cross-sectional shape of the venting notch perpendicular to a longitudinal direction thereof may be a quadrangular shape, a triangular shape, an arc shape, or a trapezoidal shape.

The battery case may be cylindrical battery case, and the venting notch may be formed in an entire outer circumferential surface of the battery case. The battery case may be a prismatic battery case having an upper surface and a lower surface, parallel to each other, and four side surfaces, which interconnect the upper surface and the lower surface.

In another aspect, the present invention provides a battery comprising the above-described battery case.

The above and other aspects will be described in detail below.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION

Figure 1:
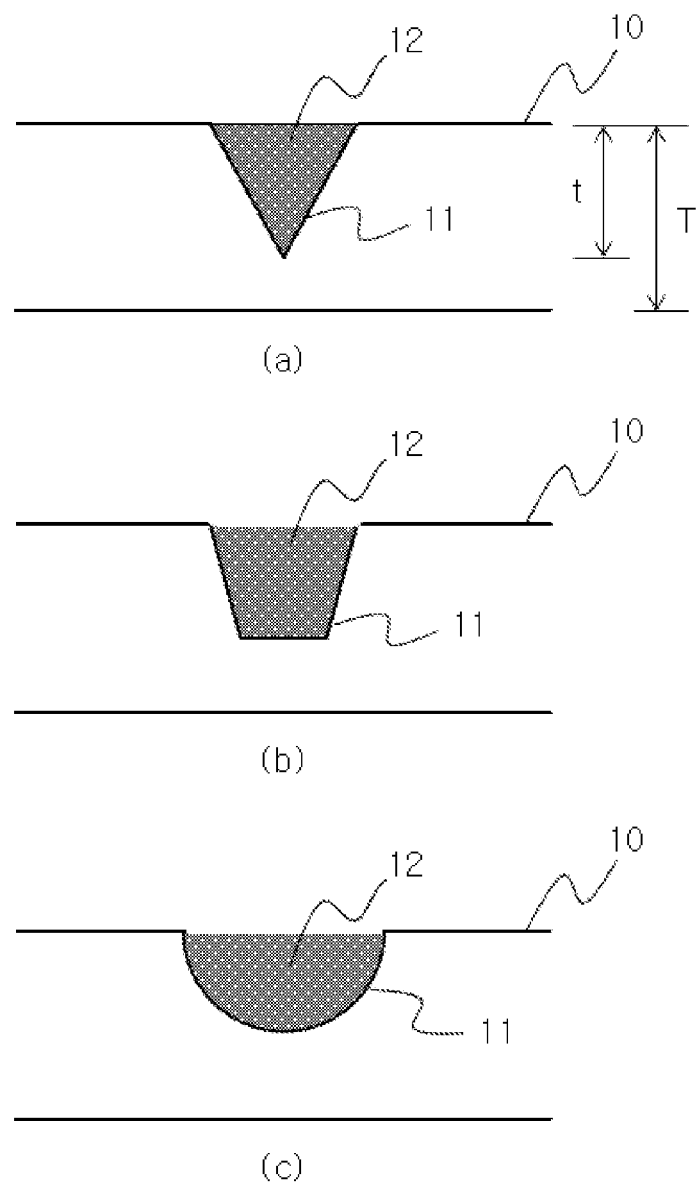
FIG. 1 is a vertical sectional view showing a venting unit of a battery case according to an exemplary embodiment of the present invention.

An object of the present invention is to provide a battery case including a venting unit having an improved structure in which the venting unit may effectively rupture when a battery is in an abnormal state (e.g., high internal pressure).

In accordance with an aspect of the present invention, the above and other objects may be accomplished by the provision of a battery case configured such that at least one venting notch is formed in the inner surface or the outer surface of the battery case and such that the venting notch is filled with a thermoplastic resin.

The battery case may be made of one of a metal, a resin, or a laminate sheet. The venting notch may be formed to allow gas to be discharged in advance to prevent a battery from exploding when the pressure in the battery case increases due to an abnormal state of the battery.

The venting notch may be formed along a curved line, a straight line, a combination of a curved line and a straight line, and/or a plurality of dots. In particular, the venting notch may be formed such that a cross-sectional shape of the venting notch in a longitudinal direction thereof is one of a quadrangular shape, a triangular shape, an arc shape, and a trapezoidal shape. The depth of the venting notch may be about 100 to 150% compared with a depth of a venting notch without thermoplastic resin filled.

Further, the thermoplastic resin may have a glass transition temperature lower than the temperature limit of the battery for a safe operation. In particular, the glass transition temperature may range from about 110° C. to 140° C. The thermoplastic resin may be at least one selected from the group consisting of polyethylene, polyethylene terephthalate, polyvinyl chloride, polyvinylidene chloride, polystyrene, polypropylene, a polyamide resin, and a celluloid resin. The thermoplastic resin may fill about 100% or less of the depth of the venting notch.

The battery case may be a cylindrical battery case, and the venting notch may be formed in the entire outer circumferential surface of the battery case. The battery case may be a prismatic battery case, which includes an upper surface and a lower surface, which are parallel to each other, and four side surfaces, which interconnect the upper surface and the lower surface, the side surfaces may include a pair of long-side surfaces, which are opposite each other, and a pair of short-side surfaces, which are opposite each other, and at least one venting notch may be formed in the upper surface, the lower surface, or the long-side surfaces.

In accordance with another aspect of the present invention, a battery including the battery case is provided. The battery may be a primary battery or a secondary battery. Based on the shape of a battery case, the secondary battery may be a cylindrical battery having an electrode assembly mounted in a cylindrical metal can, a prismatic battery having an electrode assembly mounted in a prismatic metal can, or a pouch-shaped battery having an electrode assembly mounted in a pouch-shaped case made of an aluminum laminate sheet. The secondary battery may be a lithium secondary battery having a structure in which an electrode assembly, in which a separator is interposed between a positive electrode and a negative electrode, is impregnated with a non-aqueous electrolytic solution containing lithium salt.

The positive electrode may be manufactured, for example, by applying a positive electrode mixture including a positive electrode active material to a positive electrode current collector and drying the positive electrode mixture. The positive electrode mixture may further selectively include a binder, a conductive agent, and a filler as needed. Generally, the positive electrode current collector is manufactured to have a thickness of about 3 to 500 μm. The positive electrode current collector is not particularly restricted, as long as the positive electrode current collector exhibits high conductivity while the positive electrode current collector does not induce any chemical change in a battery to which the positive electrode current collector is applied. For example, the positive electrode current collector may be made of stainless steel, aluminum, nickel, titanium, or plastic carbon. Alternatively, the positive electrode current collector may be made of aluminum or stainless steel, the surface of which is treated with carbon, nickel, titanium, or silver. In addition, the positive electrode current collector may have a microscale uneven pattern formed on the surface thereof to increase the force of adhesion of the positive electrode active material. The positive electrode current collector may be configured in various forms, such as a film, a sheet, a foil, a net, a porous body, a foam body, and a non-woven fabric body.

The positive electrode active material may be a material capable of inducing an electrochemical reaction. The positive electrode active material may be a transition metal oxide including two or more transition metals. For example, the positive electrode active material may be, but is not limited to, a layered compound, such as a lithium cobalt oxide ($LiCoO_2$) or a lithium nickel oxide ($LiNiO_2$) substituted with one or more transition metals; a lithium manganese oxide substituted with one or more transition metals; a lithium nickel-based oxide represented by the chemical formula $LiNi_{1-y}M_yO_2$ (where M=Co, Mn, Al, Cu, Fe, Mg, B, Cr, Zn, or Ga, at least one of which is included, and $0.01 \leq y \leq 0.7$); a lithium nickel cobalt manganese composite oxide represented by the chemical formula $Li_{1+z}Ni_b Mn_cCo_{1-(b+c+d)}M_dO_{(2-e)}A_e$ (where $-0.5 \leq z \leq 0.5$, $0.1 \leq b \leq 0.8$, $0.1 \leq c \leq 0.8$, $0 \leq d \leq 0.2$, $0 \leq e \leq 0.2$, b+c+d<1, M=Al, Mg, Cr, Ti, Si, or Y, and A=F, P, or Cl), such as $Li_{1+z}Ni_{1/3}Co_{1/3}Mn_{1/3}O_2$ or $Li_{1+z}Ni_{0.4}Mn_{0.4}Co_{0.2}O_2$; or olivine-based lithium metal phosphate represented by the chemical formula $Li_{1+x}M_{1-y}M'_yPO_{4-z}X_z$ (where M=a transition metal, preferably Fe, Mn, Co, or Ni, M'=Al, Mg, or Ti, X=F, S, or N, $-0.5 \leq x \leq 0.5$, $0 \leq y \leq 0.5$, and $0 \leq z \leq 0.1$).

The conductive agent may be added by about 1 to 30 weight % based on the total weight of the compound including the positive electrode active material. The conductive agent is not particularly restricted, as long as the conductive agent exhibits high conductivity without inducing any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as a zinc oxide or potassium titanate; a conductive metal oxide, such as a titanium oxide; or conductive materials, such as polyphenylene derivatives, may be used as the conductive agent.

The binder, which may be included in the positive electrode, may be a component that assists in binding between the active material and the conductive agent and in binding with the current collector. The binder may be added in an amount of about 1 to 30 weight % based on the total weight of the compound including the positive electrode active material. Examples of the binder may include polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers.

The filler may be a component used to inhibit expansion of the electrode. There is no particular limit to the filler, as long as the filler is made of a fibrous material while the filler does not cause chemical changes in a battery to which the filler is applied. Examples of the filler may include olefin-based polymers, such as polyethylene and polypropylene; and fibrous materials, such as glass fiber and carbon fiber.

The negative electrode may be manufactured, for example, by applying a negative electrode mixture including a negative electrode active material to a negative electrode current collector and drying the negative electrode mixture. The negative electrode mixture may include the above-described components, such as a conductive agent, a binder, and a filler, as needed. Generally, the negative electrode current collector may be manufactured to have a thickness of about 3 to 500 μm. The negative electrode current collector is not particularly restricted, as long as the negative electrode current collector exhibits high conductivity while the negative electrode current collector does not induce any chemical change in a battery to which the negative electrode current collector is applied. For example, the negative electrode current collector may be made of copper, stainless steel, aluminum, nickel, titanium, or plastic carbon. Alternatively, the negative electrode current collector may be made of copper or stainless steel, the surface of which is treated with carbon, nickel, titanium, or silver, or an aluminum-cadmium alloy. In addition, the negative electrode current collector may have a micro-scale uneven pattern formed on the surface thereof to increase the force of adhesion of the negative electrode active material, in the same manner as the positive electrode current collector. The negative electrode current collector may be configured in various forms, such as a film, a sheet, a foil, a net, a porous body, a foam body, and a non-woven fabric body.

The negative electrode active material may include the above-described silicon-based compound. The negative electrode active material, for example, may include carbon, such as a non-graphitizing carbon or a graphite-based carbon; a metal composite oxide, such as $Li_xFe_2O_3$ ($0 \leq x \leq 1$), $Li_xWO_2$ ($0 \leq x \leq 1$), or $Sn_xMe_{1-x}Me'_yO_z$ (Me': Mn, Fe, Pb, Ge; Me': Al, B, P, Si, Group 1, 2 and 3 elements of the periodic table, halogen; $0 \leq x \leq 1$; $1 \leq y \leq 3$; $1 \leq z \leq 8$); lithium metal; lithium alloy; silicon-based alloy; tin-based alloy; a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; a conductive polymer, such as polyacetylene; or a Li—Co—Ni based material.

The binder, the conductive agent, and other components added as necessary may be identical to those described in connection with the positive electrode. Depending on the circumstances, a filler may be selectively added as a component used to inhibit expansion of the negative electrode. There is no particular limit to the filler so long as the filler is made of a fibrous material while the filler does not cause chemical changes in a battery to which the filler is applied. Examples of the filler may include olefin polymers, such as polyethylene and polypropylene; and fibrous materials, such as glass fiber and carbon fiber.

In addition, other components, such as a viscosity-controlling agent and an adhesion promoter, may selectively be further included, either alone or as a combination of two or more components. The viscosity-controlling agent may be a component for controlling the viscosity of the electrode mixture to facilitate mixing of the electrode mixture and coating thereof on the current collector. The viscosity-controlling agent may be added in an amount of up to about 30 weight % based on the total weight of the negative electrode mixture. Examples of the viscosity-controlling agent include, without being limited to, carboxymethylcellulose and polyvinylidene fluoride. However, the present invention is not limited thereto. Depending on the circumstances, the above-described solvent may also function as the viscosity-controlling agent.

The adhesion promoter may be an auxiliary component that is added to improve adhesion between the electrode active material and the electrode current collector. The adhesion promoter may be added in an amount of about 10 weight % or less based on the amount of the binder. Examples of the adhesion promoter may include, without being limited to, oxalic acid, adipic acid, formic acid, acrylic acid derivatives, and itaconic acid derivatives.

The non-aqueous electrolytic solution containing lithium salt may include an electrolytic solution and lithium salt. A non-aqueous organic solvent, an organic solid electrolyte, or an inorganic solid electrolyte may be used as the electrolytic solution. Examples of the non-aqueous organic solvent may include non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte may include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups. Examples of the inorganic solid electrolyte may include nitrides, halides, and sulphates of lithium (Li), such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$. The lithium salt may be a material that is readily soluble in the above-mentioned non-aqueous electrolyte, and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imide.

In addition, to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolytic solution. Depending on the circumstances, to impart incombustibility thereto, the non-aqueous electrolytic solution may further include halogen-containing solvents, such as carbon tetrachloride and ethylene trifluoride. Furthermore, to improve high-temperature retention characteristics thereof, the non-aqueous electrolytic solution may further include carbon dioxide gas. Moreover, fluoro-ethylene carbonate (FEC) and propene sultone (PRS) may be further included.

In an example, lithium salt, such as $LiPF_6$, $LiClO_4$, $LiBF_4$, or $LiN(SO_2CF_3)_2$, may be added to a mixed solvent of cyclic carbonate, such as EC or PC, which is a high-dielectric solvent, and linear carbonate, such as DEC, DMC, or EMC, which is a low-viscosity solvent, to manufacture a non-aqueous electrolyte containing lithium salt.

In accordance with a further aspect of the present invention, a battery pack including the battery is provided. Specifically, the battery pack may be used as a power source for a device requiring the ability to withstand high temperatures, a long cycle, high rate characteristics, and the like. Examples of the device may include a mobile electronic device, a wearable electronic device, a power tool driven by a battery-powered motor, an electric automobile, such as an electric vehicle (EV), a hybrid electric vehicle (HEV), or a plug-in hybrid electric vehicle (PHEV), an electric two-wheeled vehicle, such as an electric bicycle (E-bike) or an electric scooter (E-scooter), an electric golf cart, and a power storage system. However, the present invention is not limited thereto.

The structure and manufacturing method of the device are well known in the art to which the present invention pertains, and a detailed description thereof will be omitted.

As is apparent from the above description, the battery case according to an exemplary embodiment of the present invention may be configured such that the venting notch is filled with the thermoplastic resin. Consequently, the thermoplastic resin may melt (i.e. undergo glass transition) at a temperature at which the safety of the battery is compromised or a higher temperature. Accordingly, the venting notch may be exposed, whereby gas may be discharged from the battery.

The thermoplastic resin may cover the venting notch in a solid state when the temperature of the thermoplastic resin is lower than a glass transition temperature, i.e. lower than a temperature at which the battery may catch fire. Consequently, the venting notch may be protected from physical impacts. However, the thermoplastic resin may undergo glass transition at a temperature at which the battery may catch fire or a higher temperature. Therefore, the venting notch may be instantaneously exposed to external stress. Accordingly, a deep venting notch may be formed in a general battery case. In addition, the venting notch may be prevented from rupturing when the battery is in the normal operating state (e.g., the temperature and pressure are lower than particular values), and the venting notch may more rapidly and accurately rupture at a temperature at which the battery may catch fire to effectively discharge gas generated in the battery.

In addition, since thermoplastic resins having different glass transition temperatures may be selectively used, venting pressure may be set differently depending on the kind and characteristics of the battery to reliably rupture the venting notch at an appropriate critical value thereof. The venting notch, which may require precise physical processing, may have different critical values for individual batteries. On the other hand, the glass transition temperature of the thermoplastic resin may be one of the properties of a material. Consequently, the same property may be realized for all batteries through the selection of a material. Further, the venting notch according to an exemplary embodiment of the present invention may exhibit a reliable gas discharge characteristic capable of accurately specifying the temperature at which the battery may catch fire.

Hereinafter, exemplary embodiments of the present invention will be described in detail with reference to the accompanying drawings such that the exemplary embodiments of the present invention may be implemented by a person having ordinary skill in the art to which the present invention pertains. In describing the principle of operation of the exemplary embodiments of the present invention in detail, however, a detailed description of known functions and configurations incorporated herein will be omitted to avoid obscuring the subject matter of the present invention.

Wherever possible, the same reference numbers will be used throughout the drawings to refer to parts that perform similar functions or operations. Meanwhile, when one part is 'connected' to another part in the following description of the present invention, not only may the one part be directly connected to the another part, but also, the one part may be indirectly connected to the another part via a further part. In addition, that a certain element is 'included' means that other elements are not excluded, but may be further included unless mentioned otherwise.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present invention, examples of which are illustrated in the accompanying drawings.

FIG. 1 is a vertical sectional view showing a venting unit of a battery case according to an exemplary embodiment of the present invention. Referring to FIG. 1, the venting unit may include a venting notch 11 formed in the inner surface or the outer surface of the battery case 10 and a thermoplastic resin 12 that fills the venting notch 11. When the temperature or pressure in a battery increases to a particular temperature or to a particular pressure due to an abnormal state of the battery, such as a short circuit occurring in the battery, when the battery is charged beyond an allowable current or voltage (e.g., overcharge), the exposure of the battery to high temperatures, or an impact applied to the battery due to, for example, dropping the battery, the thermoplastic resin 12 may melt (i.e. may undergo glass transition). Consequently, the tensile force of the thermoplastic resin 12, by which the venting notch is fixed, may disappear or substantially decreased, or the thermoplastic resin 12 may be discharged from the venting notch 11, and the venting notch 11 may be exposed or may rupture, by which gas may be discharged from the battery. Since minimal stress is applied to the venting notch when the temperature of the thermoplastic resin is lower than a glass transition temperature, the depth or the like of the venting notch may be set to allow the venting notch to rupture more easily than at a normal pressure based on a reference temperature or a reference pressure at the time of designing the battery. When the thermoplastic resin melts (i.e. undergoes glass transition) at higher than a critical temperature, therefore, the venting notch, the stress of which may have already exceeded the limit thereof, and may instantaneously rupture.

The battery case 10 may be made of one of a metal, a resin, or a laminate sheet. When the battery case 10 is made of a polymer resin, the polymer resin may have a glass transition temperature higher than the glass transition temperature of the thermoplastic resin 12 filling the venting notch 11.

The venting notch 11 may be formed using various methods. For example, the venting notch 11 may be formed by applying pressure to the battery case 11 using a separate punch. Depending on the circumstances, the venting notch 11 may be formed by scoring (e.g., scratching or incision) the surface of the battery case 11 using a predetermined tool. Alternatively, the venting notch 11 may be formed by etching a corresponding portion of the battery case 11.

The vertical cross-sectional shape of the venting notch 11 is not particularly restricted, as long as the battery case 10 may rupture at the venting notch when the pressure in the battery case increases. The thickness of the remaining portion of the battery case 10 (i.e. a "vent thickness") may gradually decrease from opposite ends to the middle of the battery case in the longitudinal direction of the battery case. For example, the venting notch 11 may be formed such that the vertical cross-sectional shape of the venting notch is one of a wedge shape, a quadrangular shape, an arc shape, and a trapezoidal shape.

When the venting notch 11 is formed in a wedge shape, the venting notch 11 may rupture due to cracks formed at an end thereof. When the venting notch is formed in a trapezoidal shape, the short side of the venting notch may be lengthened, whereby the venting notch may rupture due to shear stress thereof. When the venting notch is formed in an arc shape, gas may be prevented from being excessively discharged through a specific region of the venting notch 11, whereby variation in the pressure of the venting notch 11 may be minimized when the venting notch 11 ruptures, and the strength of the battery case may be secured although the battery case is thin. Consequently, uniform and instantaneous rupture of the venting notch 11 may be induced, thereby improving the safety of the battery.

The thermoplastic resin 12 may cover the venting notch 11 in a solid state when the temperature of the thermoplastic resin 12 is lower than a glass transition temperature, which may be lower than a temperature at which the battery may catch fire. Consequently, the venting notch 11 may be protected from physical impacts. In addition, the venting notch 11 according to an exemplary embodiment of the present invention may be formed such that the depth of the venting notch 11 is greater than the depth of a conventional venting notch. Specifically, the depth t of the venting notch 11 may be about 100 to 150% of the depth of a venting notch formed in a conventional battery case, in which a venting notch not filled with a thermoplastic resin.

The depth of the conventional venting notch is about 0.1 mm, and has a tolerance of 0.05 mm depending on operating pressure. When the depth of the conventional venting notch deviates from the above range, the venting notch ruptures due to even minimal physical impacts and pressure when the thickness of the battery case 10 is decreased. Consequently, the venting notch exhibits low resistance to high pressure. In contrast, according to an exemplary embodiment of the present invention, the venting notch may be filled with the thermoplastic resin 12, thereby protecting the battery from physical impacts. In addition, the venting notch 11 may be prevented from unintendedly rupturing at a low pressure.

Furthermore, the thermoplastic resin 12 may fill about 100% or less of the depth of the venting notch 11. Specifically, the thermoplastic resin 12 may fill about 80% to 100% of the depth of the venting notch 11. When the amount of thermoplastic resin 12 is too small, it may be impossible to sufficiently fill the venting notch 11 with the thermoplastic resin 12 and may fail to protect the venting unit 20 from physical impacts. When the amount of thermoplastic resin 12 is too large, e.g. if the thermoplastic resin 12 fills more than 100% of the depth of the venting notch 11, the battery may protrude outwards in a convex shape. In addition, it may be difficult to expose the venting notch 11 when the battery is in a dangerous state, and the rupturing of the venting unit 20 may be delayed.

The thermoplastic resin 12 may have a glass transition temperature that is lower than the temperature at which the safety of the battery is compromised, i.e., a temperature limit for a safe operation of the battery. Specifically, the thermoplastic resin 12 may have a glass transition temperature of about 100° C. to about 150° C., preferably 110° C. to 140° C. When the glass transition temperature of the thermoplastic resin 12 is within the above-defined range, the thermoplastic resin 12 may undergo glass transition at a temperature at which the battery may catch fire, and the thermoplastic resin 12 may become fluidic (e.g., mobile or free flowing) to protect the battery.

If the glass transition temperature of the thermoplastic resin 12 is less than the above-defined range, the thermoplastic resin 12 may be present in a melt state, and it may be difficult to guarantee the safety of the battery. If the glass transition temperature of the thermoplastic resin 12 is greater than the above-defined range, the thermoplastic resin 12 may be present in a hardened state even when the battery is unstable and thus may catch fire, whereby the venting notch 11 may be unexposed and may fail to rupture. Consequently, gas generated in the battery may not be discharged, and therefore the battery may explode.

At least one selected from a group consisting of polyethylene, polyethylene terephthalate, polyvinyl chloride, polyvinylidene chloride, polystyrene, polypropylene, a polyamide resin, and a celluloid resin may be used as the thermoplastic resin 12. In addition, since thermoplastic resins having different glass transition temperatures may be selectively used, venting pressure may be set differently depending on the kind (e.g., type) and characteristics of the battery, whereby the venting notch may reliably rupture at an appropriate critical value thereof.

Figure 2:
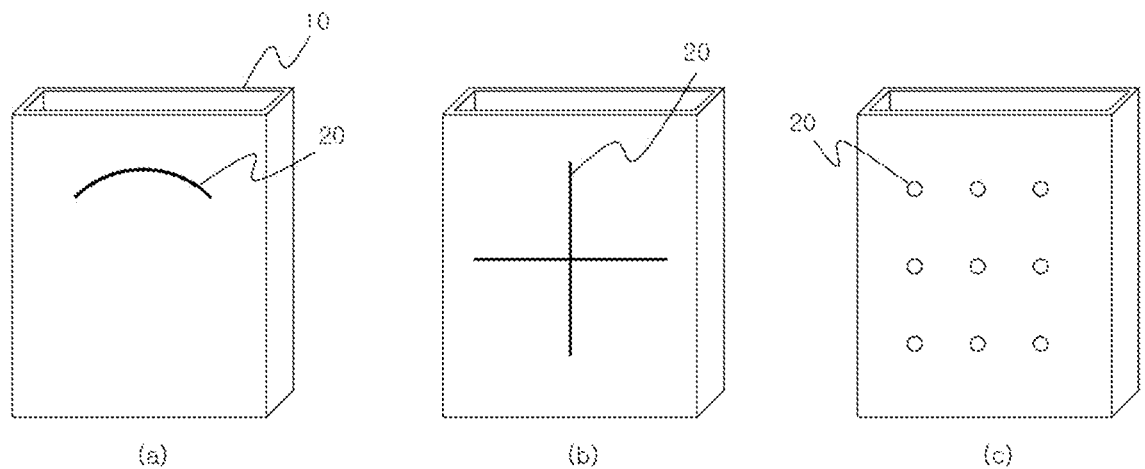
FIG. 2 is a perspective view showing a prismatic battery case according to an exemplary embodiment of the present invention.

FIG. 2 is a perspective view showing a prismatic battery case 10 according to an exemplary embodiment of the present invention. The prismatic battery case 10 may be made of a metal material, such as aluminum, an aluminum alloy, or stainless steel. The prismatic battery case 10 may include an upper surface and a lower surface, which are parallel to each other, and four side surfaces, which interconnect the upper surface and the lower surface. The side surfaces may include a pair of long-side surfaces, which are opposite each other, and a pair of short-side surfaces, which are opposite each other. At least one venting notch 11 included in a venting unit 20 may be formed in the upper surface, the lower surface, or the long-side surfaces. FIG. 2 shows an exemplary embodiment of a venting notch formed in one surface.

Figure 3:
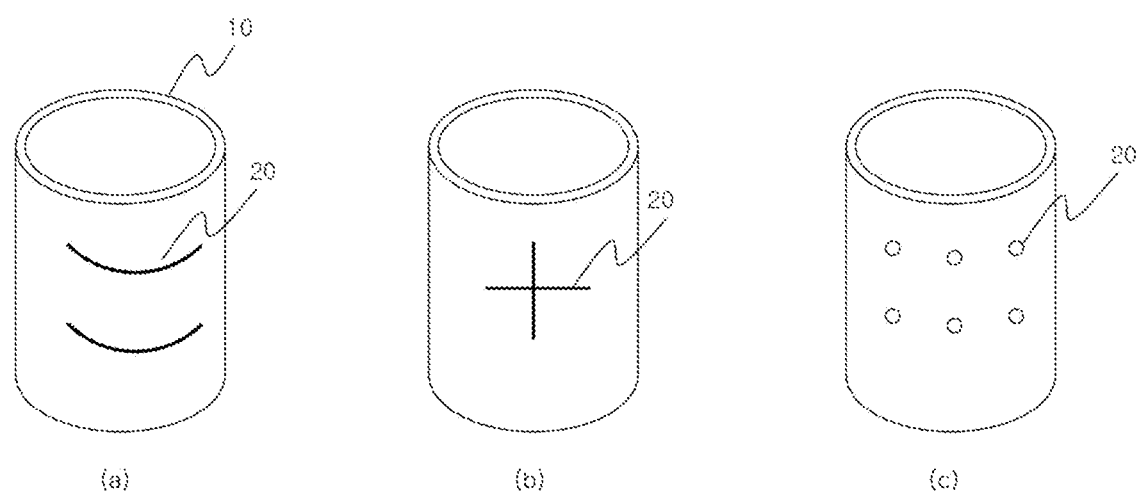
FIG. 3 is a perspective view showing a cylindrical battery case according to another exemplary embodiment of the present invention.

FIG. 3 is a perspective view showing a cylindrical battery case 10 according to another exemplary embodiment of the present invention. The cylindrical battery case 10 may be made of a metal material, such as aluminum, an aluminum alloy, or stainless steel. The cylindrical battery case 10 may have a cylindrical structure having an open upper end and a closed lower end, which is opposite the open upper end. A venting notch 11 included in a venting unit 20 may be formed in the outer circumferential surface of the battery case 10.

In FIGS. 2 and 3, the venting notch 11 is shown as a curve, a cross shape, and a plurality of dots. Alternatively, the front shape of the venting notch 11 may be a curved line, a straight line, a combination of a curved line and a straight line, and/or a plurality of dots. The shape of the venting notch 11 is not particularly restricted. In addition, the venting notch 11 may be formed in the outer surface or the inner surface of the battery case 10. Furthermore, the venting notch 11 may be formed in the entire outer surface or the entire inner surface of the battery case 10.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A battery case, comprising:
   a venting notch formed in an inner surface or an outer surface of the battery case, wherein the venting notch has a closed bottom end; and
   a thermoplastic resin disposed within the venting notch,
   wherein the venting notch is configured to allow gas to be discharged to prevent a battery from exploding when a pressure in the battery case increases, and the thermoplastic resin is configured to have a predetermined glass transition temperature lower than a predetermined temperature limit of battery operation,
   wherein a depth of the venting notch is less than a thickness of the battery case, the depth of the venting notch being about 0.05 mm to 0.225 mm,
   wherein the thermoplastic resin fills less than an entire depth of the venting notch, and
   wherein, when a temperature of the battery case is increased to the predetermined glass transition temperature of about 110° C. to 140° C., the thermoplastic resin within the venting notch having the closed bottom end is configured to undergo a glass transition at the predetermined glass transition temperature and is configured to reduce a pressure at which the venting notch ruptures,
   wherein the venting notch is formed along at least one of a curved line, a straight line, a combination of a curved line and a straight line, and a plurality of dots,
   wherein a cross-sectional shape of the venting notch perpendicular to a longitudinal direction thereof is a quadrangular shape, a triangular shape, an arc shape, or a trapezoidal shape,
   wherein the thermoplastic resin is at least one selected from a group consisting of polyvinyl chloride, polyvinylidene chloride, polystyrene, polypropylene, a polyamide resin, and a celluloid resin,
   wherein the battery case is a cylindrical battery case, and the venting notch is formed in an outer circumferential surface of the battery case, and
   wherein the battery case is made of a metal, a resin, or a laminate sheet.

* * * * *